(12) United States Patent
DeBrock et al.

(10) Patent No.: US 10,966,896 B2
(45) Date of Patent: Apr. 6, 2021

(54) ROLLATOR BRAKING SYSTEM

(71) Applicants: Heather DeBrock, Geneseo, IL (US); Drew DeBrock, Geneseo, IL (US)

(72) Inventors: Heather DeBrock, Geneseo, IL (US); Drew DeBrock, Geneseo, IL (US)

(73) Assignee: MAPLE LEAF MEDICAL SERVICES LLC, Geneseo, IL (US)

( * ) Notice: Subject to any disclaimer, the term of this patent is extended or adjusted under 35 U.S.C. 154(b) by 107 days.

(21) Appl. No.: 15/713,160

(22) Filed: Sep. 22, 2017

(65) Prior Publication Data

US 2018/0021205 A1    Jan. 25, 2018

Related U.S. Application Data

(63) Continuation-in-part of application No. 15/383,586, filed on Dec. 19, 2016, now abandoned.

(60) Provisional application No. 62/268,621, filed on Dec. 17, 2015.

(51) Int. Cl.
| | |
|---|---|
| *A61H 3/04* | (2006.01) |
| *A61G 5/10* | (2006.01) |
| *B60T 1/00* | (2006.01) |
| *B60T 7/10* | (2006.01) |
| *B62L 3/06* | (2006.01) |
| *B62K 23/06* | (2006.01) |
| *B62K 5/003* | (2013.01) |
| *B62L 3/02* | (2006.01) |
| *B60T 7/08* | (2006.01) |
| *B60T 11/04* | (2006.01) |

(52) U.S. Cl.
CPC .............. *A61H 3/04* (2013.01); *A61G 5/101* (2013.01); *B60T 1/005* (2013.01); *B60T 7/08* (2013.01); *B60T 7/105* (2013.01); *B60T 7/108* (2013.01); *B60T 11/046* (2013.01); *B62K 5/003* (2013.01); *B62K 23/06* (2013.01); *B62L 3/02* (2013.01); *B62L 3/06* (2013.01); *A61H 2003/046* (2013.01); *A61H 2201/0192* (2013.01)

(58) Field of Classification Search
None
See application file for complete search history.

(56) References Cited

U.S. PATENT DOCUMENTS

| | | | | |
|---|---|---|---|---|
| 4,907,794 | A | | 3/1990 | Rose |
| 5,865,065 | A | * | 2/1999 | Chiu .................. B62L 3/02 74/489 |
| 5,878,625 | A | * | 3/1999 | Hu .................... A61H 3/04 74/489 |
| 5,954,161 | A | * | 9/1999 | Lee ................... A61H 3/04 188/2 D |

(Continued)

*Primary Examiner* — Katy M Ebner
(74) *Attorney, Agent, or Firm* — Lempia Summerfield Katz LLC

(57) ABSTRACT

A braking system for a rollator with a frame includes an adjustable handle to be installed on a right subframe or a left subframe of the frame of the rollator, a bracket fixedly connected to the handle, a lever rotatably connected to the bracket, a lock movably connected to the bracket and configured to fix the lever in a locked position when the lock is moved relative to the bracket once the lever is rotated toward the frame, and a wire operably connected between the lever and a brake on the frame of the rollator, such that the wire applies the brake when the lever is rotated toward the bracket and when the lever is fixed in the locked position.

10 Claims, 14 Drawing Sheets

(56) References Cited

U.S. PATENT DOCUMENTS

| | | | |
|---|---|---|---|
| 6,032,765 A * | 3/2000 | Hsi-Chia | B62K 23/06 135/67 |
| 6,079,290 A * | 6/2000 | Li | A61H 3/04 74/489 |
| 6,202,502 B1 * | 3/2001 | Chung-Che | A61H 3/04 74/489 |
| 6,374,694 B1 * | 4/2002 | Chen | B60T 7/10 74/489 |
| 6,457,377 B1 * | 10/2002 | Hsu | B60T 7/10 74/489 |
| 6,622,587 B1 * | 9/2003 | Wu | A61H 3/04 74/489 |
| 6,647,825 B1 * | 11/2003 | Lin | B60T 7/102 74/489 |
| 7,052,030 B2 * | 5/2006 | Serhan | A61H 3/04 280/304.1 |
| 7,370,870 B2 * | 5/2008 | Andersson | A61H 3/04 280/304.1 |
| 7,484,740 B2 * | 2/2009 | Miller | A61H 3/04 135/65 |
| 7,669,863 B2 | 3/2010 | Steiner et al. | |
| 7,673,888 B2 | 3/2010 | Lauren et al. | |
| 7,866,677 B1 * | 1/2011 | Rothstein | A61H 3/04 135/67 |
| 8,083,239 B2 * | 12/2011 | Liu | A61H 3/04 135/67 |
| 8,251,380 B2 | 8/2012 | Liu | |
| 8,267,412 B2 | 9/2012 | Liu | |
| 8,448,960 B2 | 5/2013 | Liu | |
| 8,454,034 B2 | 6/2013 | Liu | |
| 8,505,936 B2 | 8/2013 | Liu | |
| 8,511,694 B2 | 8/2013 | Bradshaw et al. | |
| 8,517,399 B2 | 8/2013 | Liu | |
| 8,573,613 B2 * | 11/2013 | Liu | A61H 3/04 16/20 |
| 8,602,424 B2 | 12/2013 | Liu | |
| 8,677,857 B2 * | 3/2014 | Feldt | A61G 5/1008 74/502.2 |
| 8,840,124 B2 | 9/2014 | Serhan et al. | |
| 8,864,151 B1 | 10/2014 | Liu | |
| 8,931,366 B2 * | 1/2015 | Wu | B60T 1/04 188/24.18 |
| 8,936,256 B2 | 1/2015 | Liu | |
| 8,998,223 B2 | 4/2015 | Chang | |
| 9,022,413 B2 | 5/2015 | Liu | |
| 9,192,541 B2 | 11/2015 | Liu | |
| 9,221,433 B2 | 12/2015 | Dunlap | |
| 9,289,347 B2 | 3/2016 | Powell et al. | |
| 9,320,672 B2 | 4/2016 | Liu | |
| 9,339,432 B2 * | 5/2016 | Liu | A61H 3/04 |
| 9,415,635 B2 * | 8/2016 | Liu | B60B 33/0015 |
| 9,504,624 B2 | 11/2016 | Knopow et al. | |
| 9,744,094 B2 * | 8/2017 | Liu | A61H 3/04 |
| 10,053,062 B2 * | 8/2018 | Liu | B60T 7/102 |
| 2006/0071542 A1 * | 4/2006 | Lichtensteiger | B60T 7/10 303/89 |
| 2007/0194547 A1 | 8/2007 | Steiner et al. | |
| 2009/0033052 A1 | 2/2009 | Bradshaw et al. | |
| 2013/0092202 A1 * | 4/2013 | Wu | A61H 3/04 135/67 |
| 2013/0181489 A1 | 7/2013 | Serhan et al. | |
| 2014/0031176 A1 | 1/2014 | Knopow et al. | |
| 2015/0216757 A1 | 8/2015 | Powell et al. | |
| 2016/0184168 A1 | 6/2016 | Knopow et al. | |
| 2017/0035644 A1 | 2/2017 | Knopow et al. | |
| 2017/0174190 A1 * | 6/2017 | DeBrock | B60T 7/105 |

* cited by examiner

ROLLATOR BRAKING SYSTEM

CROSS-REFERENCE TO RELATED APPLICATIONS

This application is a continuation in part under 37 C.F.R. § 1.53(b) and 35 U.S.C § 120 of U.S. patent application Ser. No. 15/383,586 filed Dec. 19, 2016, which claims priority to U.S. Provisional Patent Application No. 62/268,621, entitled "Rollator Braking System", filed Dec. 17, 2015, both of which are hereby incorporated by reference in their entirety.

TECHNICAL FIELD

The present invention generally relates to rollators and more particularly to rollator braking systems.

BACKGROUND

Patients, their family members, and their caregivers agree that traditional rollator breaks are hard to operate. Patients have to remove their hands from the rollator handles and press down to secure the braking system. There is increased risk for a patient to lose their balance, which could result in falling. Also, it is difficult to secure the breaks due to requiring upper body strength which a majority of patients lack.

BRIEF SUMMARY

With the new breaking system, a gel handle provides more security of hand placement for patients versus the old handle, which is plastic and does not provide as a secure hold. Patients are now able to pull up on the brakes and then push the button on the sides with any finger to secure the brakes into place. The patient no longer has to remove their hands from the handle on the breaking system which is safer for the patient. The new braking system also accommodates the patient by being able to adjust the braking button to make it easier if the patient does not have much strength to secure the brake into place.

In one embodiment, a rollator with the new braking system may include a collapsible frame comprising a right subframe and a left subframe joined by a perpendicular supporting member, at least three wheels. On each of the right subframe and the left subframe is rotatably mounted at least one of the at least three wheels. The rollator of this embodiment includes a seat mounted to the right subframe and left subframe or to the perpendicular supporting member and configured to be accessible from a backside of the rollator. The rollator of this embodiment includes at least one brake mounted to the frame and operable to slow rotation of one of the at least three the wheels. The rollator of this embodiment includes an adjustable handle supported by the frame, a bracket fixedly mounted to the handle, a lever rotatably mounted to the bracket, a lock movably connected to the bracket and configured to fix the lever in a locked position, and a wire connected on a first end to the lever and on a second end to the brake such that the wire applies the brake when the lever is rotated toward the bracket and when the lever is fixed in the locked position.

The rollator may additionally include a grip connected to the handle and a backrest mounted to the right and left subframe and located along a front side of the rollator. The lever of the rollator may be configured such that when the lever is fixed in the locked position by the lock, rotating the lever toward the frame releases the lock and returns the lever to an unlocked position.

The lock may be positioned to be movable from a top surface of the frame, an inside surface of the frame, an outside surface of the frame, or any combination thereof. The wire may include a cable inside of a sheath and wherein the cable is drawn through the sheath to apply the brake.

In one embodiment, a method of manufacturing a rollator with the new braking system may include joining a right subframe and a left subframe together with a perpendicular supporting member, rotatably mounting at least three wheels to a frame of the rollator, wherein on each of the right subframe and the left subframe is rotatably mounted at least one of the at least three wheels, mounting a seat to the right subframe and left subframe or to the perpendicular supporting member, wherein the seat is configured to be accessible from a backside of the rollator, mounting a backrest to the right and left subframe along a front side of the rollator, mounting at least one brake to the frame such that the brake is operable to slow rotation of one of the at least three wheels, mounting an adjustable handle to the frame, mounting a bracket to the handle, rotatably mounting a lever to the bracket, mounting a lock to the bracket that is configured to fix the lever in a locked position, and connecting a first end of a wire to the lever and a second end of the wire to the brake such that the wire applies the brake when the lever is rotated toward the bracket and when the lever is fixed in the locked position.

The method of manufacturing may further include sliding a grip over an outer surface of the handle. The lock mounted in the method of manufacture may be configured such that when the lever is fixed in the locked position by the lock, rotating the lever toward the frame releases the lock and returns the lever to an unlocked position. The lock mounted in the method of manufacture may be positioned to be movable from a top surface of the frame, an inside surface of the frame, an outside surface of the frame, or combinations thereof. The wire connected in the method of manufacture may include a cable inside of a sheath and wherein the cable is drawn through the sheath to apply the brake.

In one embodiment, a braking system for a rollator with a frame may include an adjustable handle suitable to be installed on a right subframe or a left subframe of the frame of the rollator, a bracket fixedly connected to the handle, a lever rotatably connected to the bracket, a lock movably connected to the bracket and configured to fix the lever in a locked position when the lock is moved relative to the bracket once the lever is rotated toward the frame, and a wire operably connected between the lever and a brake on the frame of the rollator, such that the wire applies the brake when the lever is rotated toward the bracket and when the lever is fixed in the locked position.

The handle of the braking system may be adjustable in a vertical, rotational, or vertical and rotational position relative to the rollator. The lever of the braking system may be configured such that when the lever is fixed in the locked position by the lock, rotating the lever toward the frame releases the lock and returns the lever to an unlocked position. The lock of the braking system may be positioned to be movable from a top surface of the frame, an inside surface of the frame, an outside surface of the frame, or combinations thereof. Additionally or alternatively, the bracket may be configured to accommodate the lock to be movable in more than one position. The braking system may further include a grip connected to the handle.

The handle may be secured to the right subframe or the left subframe by a fastener extending through a diameter of the handle and a diameter of the right subframe or the left subframe. An end of the wire may have a cylindrical, spherical, conical, square, or rectangular profile to interface with the brake. The lever of the braking system may apply two or more brakes on the frame. The wire may include a cable inside of a sheath and wherein the cable is drawn through the sheath to apply the brake.

DETAILED DESCRIPTION OF THE DRAWINGS AND PRESENTLY PREFERRED EMBODIMENTS

Figure 1:
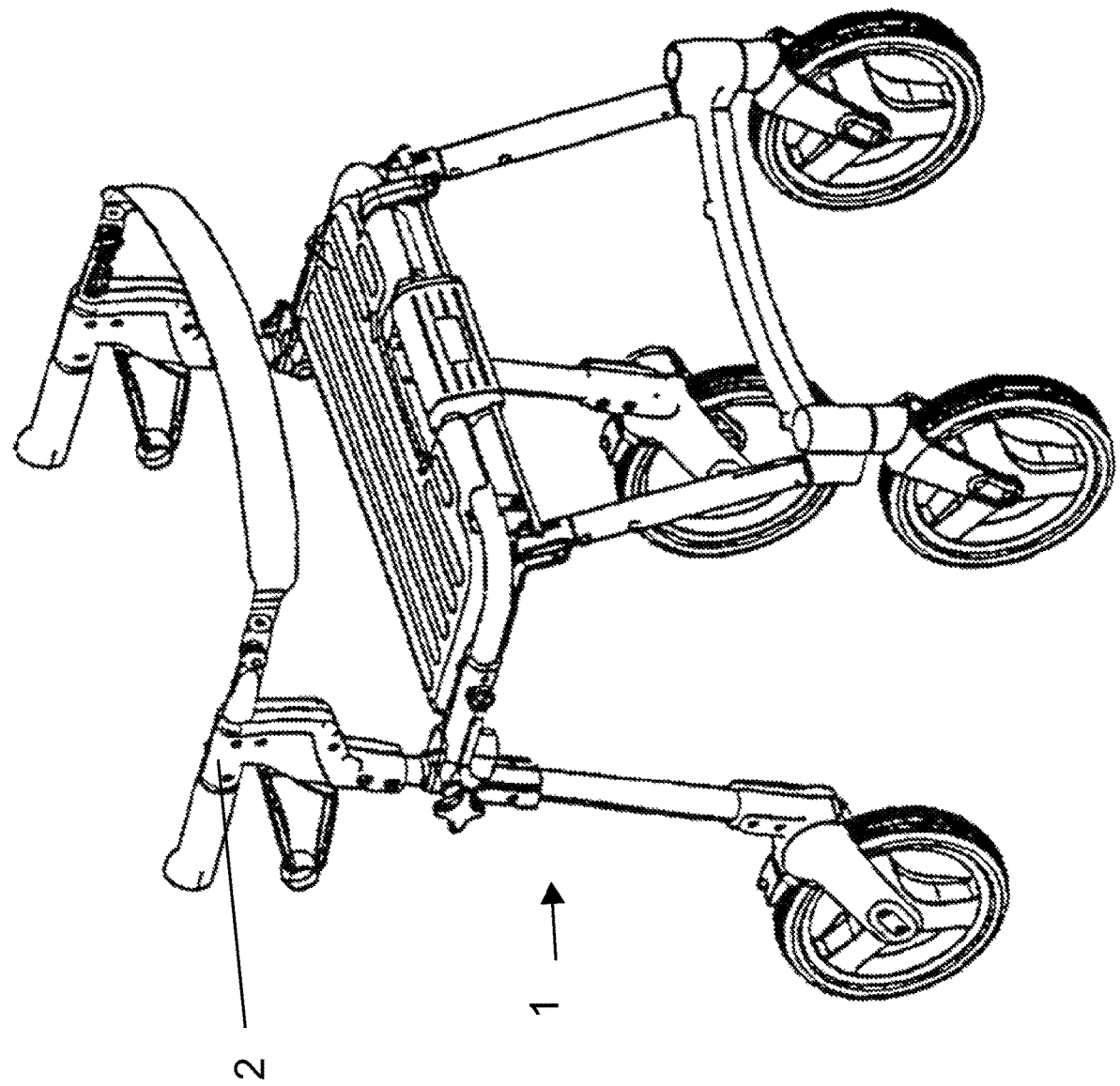
FIG. 1 is a perspective view of a rollator with a conventional braking system.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

SUMMARY OF COMPONENTS

Handle—The handle 10 is inserted into frame 20 of rollator 30 and can be adjusted for proper height. The handle 10 is held in place by a bolt with a knob 40 that is threaded to the same as the bolt. These tighten down to secure the handle 10 into place.

Wire—The wire 50 runs out of lever 60 down to the brakes 70 located by the tires which will lock the wheels. This wire 50 can be adjusted for tension on the brake 70.

Locking brake lever—This is the lever 60 that when squeezed towards the grip 100 will pull the wire 50 that is connected to the brake 70 down by the wheels. The brakes 70 can also be locked by pushing the button 110 located outside of the lever 60. The button 110 is spring loaded and after the button 110 is pushed in, the button 110 will stay in the lock position, thus keeping the brake 70 locked to the wheel. When wanting to release the brake 70 so the rollator 30 can move again, simply pull the lever 60 towards the grip 100 at the button 110 that is spring loaded will pop out and release the brake 70. The lever 60 is attached to the handle 10 by a ⅞" clamp 120 that is part of the lever 60. Once slide over the handle 10 and in position, a bolt 130 is tightened and this will clamp down and tighten to the handle 10.

Grip—The gel grip 100 is pushed on to the handle 10 once the lever 60 has been tightened into place.

Kit for Retro-Fits—A kit including the handle 10, the wire 50, the brake lever 60 with attaching bracket, the grip 100, and hardware to assemble is considered part of the invention. This kit may be used for retrofitting rollators 30 on the market and already in use with the new braking system. The existing (e.g., previously installed, original) handle, wire, grip, and brake lever are removed from the rollator 30 and the new system is installed.

In one exemplary embodiment of the invention, the locking brake lever 60 may include a Sunlite Locking Lever, model 12005. Other levers 60 may be used in other embodiments.

DETAILED DESCRIPTION

A rollator braking system for a rollator includes two handles, two brake lever assemblies, and two wires. The rollator includes a frame and a plurality of wheels attached to the frame for moving the rollator. The two handles are adjustably connected to the frame, and each handle includes a gripping member. Each of the two brake lever assemblies includes a bracket fixedly connected to the handle and a lever rotatably connected to the bracket to rotate towards and away from the gripping member when in an unlocked position, and fixedly connected to the bracket when in a locked position. Each of the two wires are operably connected between a lever assembly and a brake on one of the wheels such that when the lever is rotated towards the gripping member, the brake slows rotation of the wheel, and when the lever is in the locked position, the brake stops the rotation of the wheel.

FIG. 1 shows a rollator 1 with a conventional braking system 2. The braking system 2 includes levers in the shape of a loop through which a hand is inserted. When a lever is drawn toward a grip, a brake near a wheel is activated and stops the rollator. When the lever is pushed down and away from the grip, the brake is locked in the activated state. Pushing the lever down and away from the grip is difficult for the user because patients may lack the strength to support their own weight long enough to lock the rollator. Additionally, pushing down the lever may be difficult for patients without the ability to maintain balance.

Figure 2:
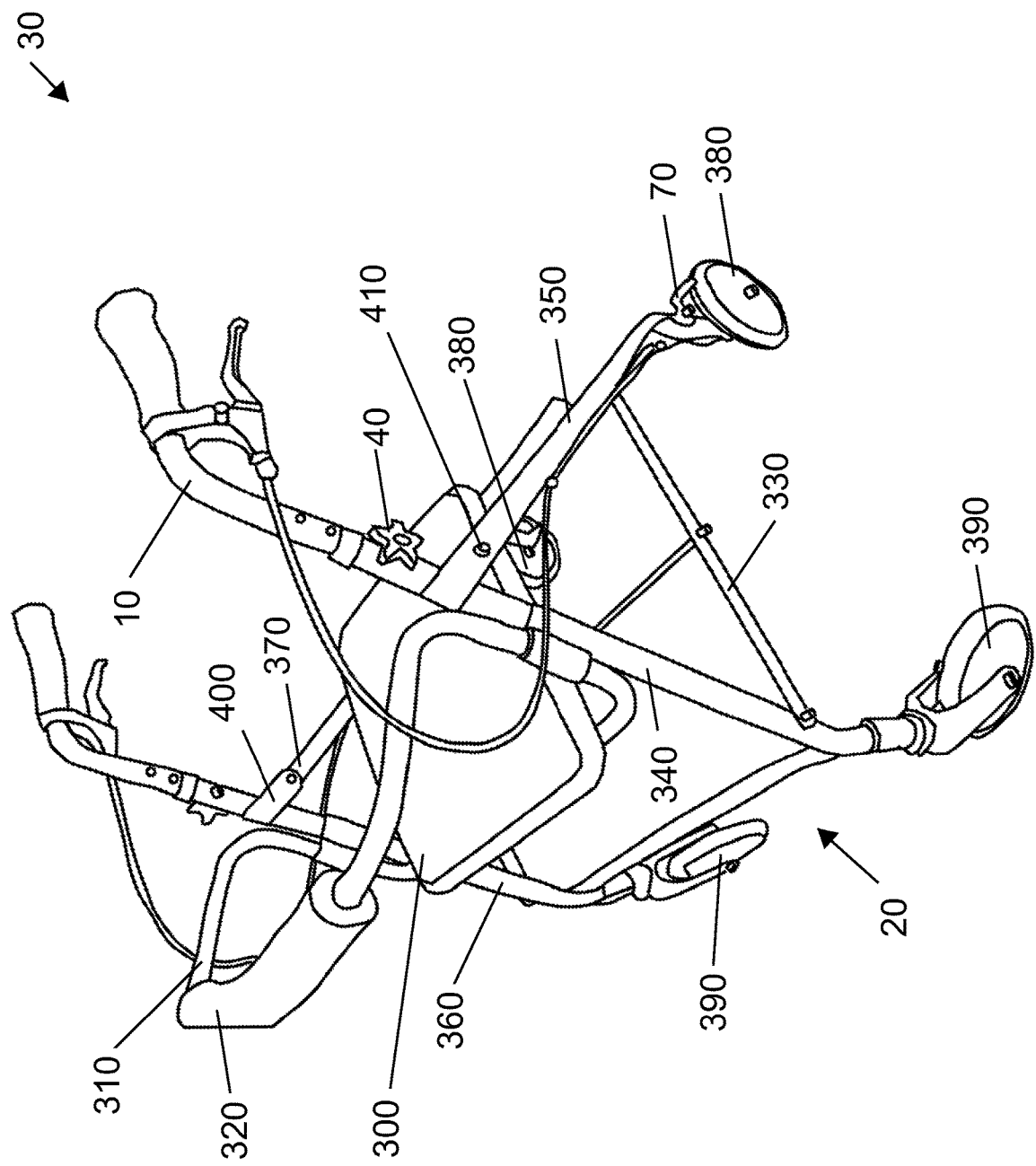
FIG. 2 is a perspective view of an exemplary rollator with the new braking system.

FIG. 2 shows an example of a rollator 30 with the new braking system installed. The rollator 30 includes a frame 20 with a seat 300. The seat 300 may be accessible from a rear of the rollator 30. In this way, the patient may park the rollator 30 by locking the brakes 70, and then sit on the seat 300 without the rollator 30 moving. The patient may park the rollator 30 by locking the brakes 70 in order to rest or lean against the handles 10 of the rollator 30. The term patient may mean any type of user of the rollator. The seat 300 may be rigid or cushioned. The seat 300 may be flat or may have a depression in a surface of the seat 300 to accommodate one or more objects (e.g. packages) or the patient. The seat 300 may be attached to the frame 20 of the rollator 30. Additionally or alternatively, the seat 300 may be supported by a backrest 310 instead of or in addition to any attachment of the seat 300 to the frame 20.

A backrest 310 may be located toward a front side of the rollator 30. The backrest 310 may include a pad 320. The backrest 310 may be configured to support a back of the patient when the patient is seated on the seat 300. The backrest 310 may be connected to the frame 20 of the rollator. For example, the frame 20 may include a collar through which the backrest 310 is inserted. In some cases, the backrest 310 provides additional support for the seat 300 of the rollator 30. The backrest 310 may be attached to the frame 20 of the rollator, for example, so that the backrest 310 may be raised or lowered relative to the frame 20 during storage or to provide a better fit for the patient. Additionally or alternatively, the backrest 310 may be attached to the seat 300 instead of being attached to the frame 20. Alternatively, the backrest 310 may be fixedly mounted to the frame 20 or the seat 300 and is not adjustable.

The frame 20 may include one or more supporting frame members 330 for joining frame members 340, 350, 360, 370. In this way, the rollator 30 may be broken down (e.g., disassembled, partially disassembled, or folded to a smaller size) for convenient storage or shipping. The front left frame member 340 may be attached to the rear left frame member 350 by a hinge 400. Similarly, the front right frame member 360 may be attached to the rear right frame member 370 by a hinge 410. The frame members 340, 350 may form a left subframe, joined to a right subframe comprising frame members 360, 370 by multiple supporting frame members 330. The supporting frame members 330 may be perpendicular to or at any other angle from the frame members 340, 350, 360, 370. The seat 300 and backrest 310 may also join the frame members 340, 350, 360, 370 together.

Each of the front frame members 340, 360 may receive a handle 10 of the braking system. In some cases, the frame members 340, 360 are hollow inside and allow for the handle 10 to be inserted into the frame members 340, 360. The frame members 340, 360 may have an interior hollow portion longer than the handle 10 such that the handle 10 may be received into the hollow for adjusting the handle 10. The handle 10, frame 20 and frame members 340, 350, 360, 370 may be made of round, hollow tubing. In some cases, the tubing for frame 20 and frame members 340, 350, 360, 370 has a 1-inch inner diameter matched to a 1-inch outer diameter for the handle 10 tubing. In other cases, the tubing for frame 20 and frame members 340, 350, 360, 370 has an inner diameter smaller than 1-inch, for example, a ⅞-inch inner-diameter tube mated to a ⅞-inch outer diameter for the handle 10 tubing. In still other cases, the tubing for frame 20 and frame members 340, 350, 360, 370 has an inner diameter larger than 1-inch, for example, a 1¼-inch inner-diameter tube mated to a 1¼-inch outer diameter for the handle 10 tubing. Tubing for the handle 10, frame 20 and frame members 340, 350, 360, 370 may be cut to length and bent into shape. The tubing for the handle 10 may be drilled or punched to create holes to fasten the handle 10 to the rollator 30. Alternatively or additionally, the handle 10, frame 20 and frame members 340, 350, 360, 370 may have a square, rectangular, or other cross-section. Hollow tubing allows for sufficient rigidity in the frame members 340, 350, 360, 370 while reducing the weight of the rollator 30. Additionally or alternatively, the frame members 340, 350, 360, 370 may be solid. Solid frame members 340, 350, 360, 370 allow the rollator 30 to withstand greater forces (e.g., the weight of the user).

The hinges 400, 410 joining the left frame members 340, 350 and the right frame members 360, 370 may allow the rollator 30 to collapse for storage. For example, by bringing the left frame members 340, 350 together and the right frame members 360, 370 together, the rollator 30 may fold up to be more compact. In some cases, the backrest 310 may act as a handle for the rollator 30 when folded, reducing the difficulty of storing and retrieving the rollator 30 from storage.

Wheels 380, 390 are mounted to the frame 20. Wheels 380 may be rotatably attached to rear frame members 350, 370 so that the wheels 380 roll with the rollator 30 but do not turn or steer. Wheels 390 may be caster wheels that are rotatably attached to the front frame members 340, 360 so that the wheels 390 roll with the rollator 30 and turn. In some cases, the wheels 390 turn on casters that are fixedly attached to the front frame members 340, 360. When the patient pushes the rollator 30 straight ahead, all the wheels 380, 390 may roll together. When the patient turns the rollator 30, the wheels 390 may angle toward the direction of the turn while the wheels 380 remain parallel. The wheels 380, 390 may be attached to the frame 20 such that the wheels 380, 390 are in line with one another. Additionally or alternatively, the wheels 380, 390 may be staggered for greater stability. For example, the wheels 380 may have a wider track than the wheels 390.

A handle 10 of the braking system is attached to the frame 20 of the rollator 30 by a fastener 40. For example, the fastener 40 may be a knob threaded on a screw. In some cases, where the handle 10 is inside and sleeved by the frame members 340, 360, the fastener 40 may extend through a diameter of the handle 10 and a diameter of the frame member 340, 360, thereby fixing the handle 10 to the frame member 340, 360. The handle 10 may have holes along its length through which the fastener 40 may extend. The braking system may include one handle 10 to control brakes 70 at two wheels 380 of the rollator 30. Additionally or alternatively, the braking system includes two handles 10 and each handle 10 controls one brake 70 at each wheel 380.

The rollator 30 may include one or more brakes 70. The brakes 70 may be pivotably or rotatably mounted to the frame 20. For example, the brake 70 may be mounted on a rear frame member 350, 370 via a pivot, such that when the brake 70 is activated via the wire 50, the brake 70 pivots on the frame member 350, 370 and engages the wheel 380 to slow the rotation of wheel 380. Additionally or alternatively, the brake 70 may be fixedly mounted to the frame 20. For example, the brake 70 may be fixedly mounted to the rear frame member 350, 370 and when the brake 70 is activated by the wire 50, a portion of the brake 70 engages the wheel 380 to slow rotation of the wheel 380. The brakes 70 may be activated by one lever 60 on one handle 10, for example, using multiple wires 50. This may allow the patient to efficiently stop the rollator 30 if the patient has strength only in one hand. Additionally or alternatively, each brake 70 may be activated by one handle 10.

Figure 3:
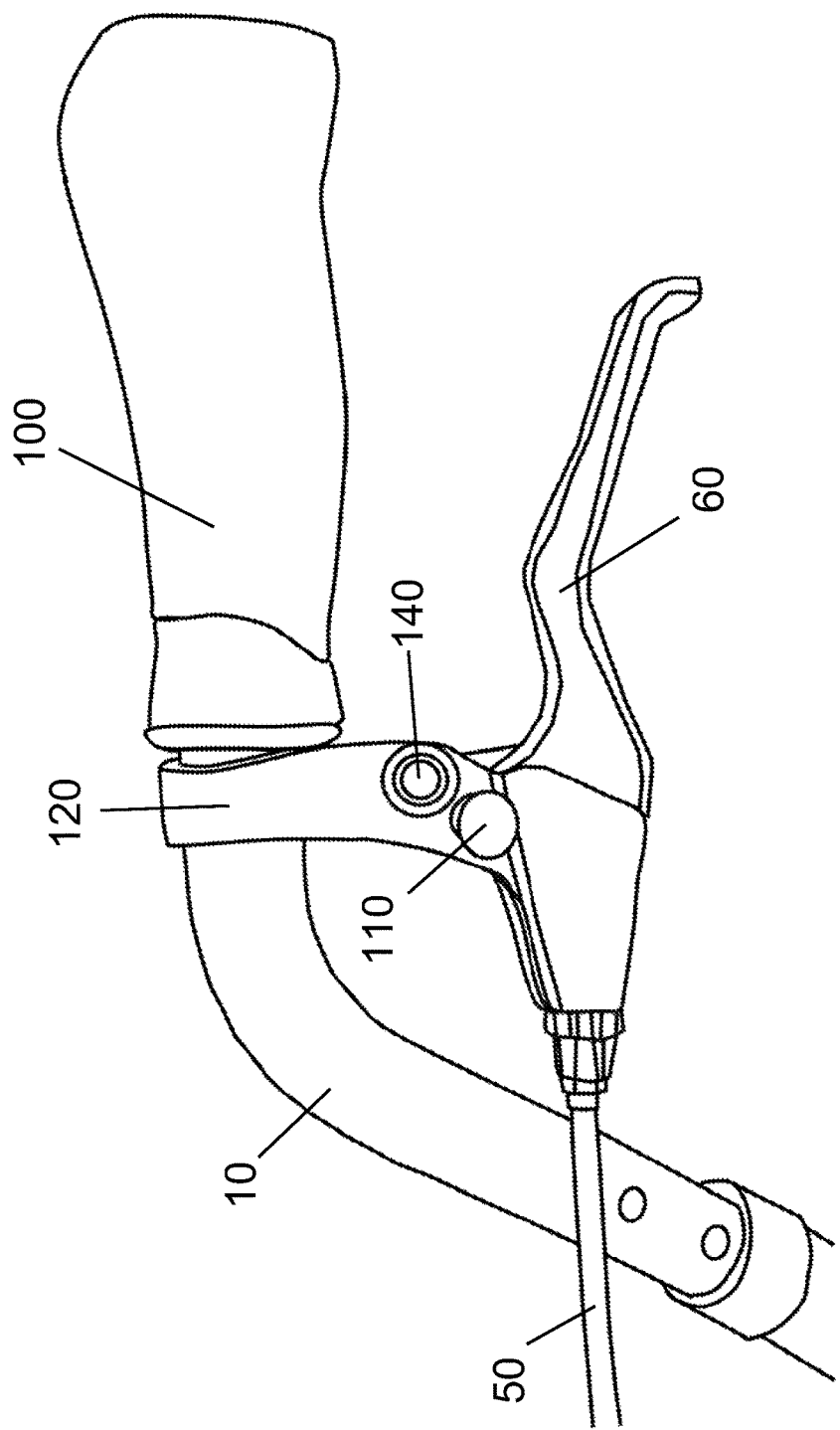
FIG. 3 is a perspective view of an exemplary embodiment of the brake lever, grip, and bar of the new braking system.

FIG. 3 shows a handle 10 of the braking system. Mounted to the handle 10 is a bracket 120 that is secured to the handle 10 via a fastener 130. For example, the fastener 130 may be a rivet, clamp, binder bolt, or pinch bolt. Binder bolts and pinch bolts may include a first bolt that threads into a hollow second bolt in order to tighten the bracket. In some cases, the pinch bolt or binder bolt may be tightened by turning either the first or second bolt. A grip 100 may be attached to the handle 10 and may be separate from or integrated with the bracket 120. The bracket 120 provides a mounting point for a wire 50 and lever 60 for activating the brakes 70 of the braking system. The handle 10 may have a bent profile between the portion of the handle 10 that connects to the frame 20 and the portion of the handle 10 where a grip 100 is attached.

The wire 50 may contain a cable that is attached to the lever 60, so that as the lever 60 is drawn toward the grip 100, the cable is drawn through the wire 50 and activates the brake 70. The wire 50 may be fastened to the bracket 120 with a nut, through which the cable may move. The wire 50 may be secured to the handle 10 or to the frame 20 of the rollator. In some cases, the wire 50 is secured with a tie, for example, a zip tie or another piece of wire. Additionally or alternatively, the wire 50 may be routed through a hollow socket that is secured to the frame 20. In some cases, the socket receives the wire 50 on one end of the socket and allows the inner cable to exit the socket on another end of the socket. Where the wire 50 enters a socket and only the inner cable exits, another socket may receive the inner cable on one side and on the other side allow the cable to exit through another section of the wire 50. This may allow for the inner cable to attach to the brakes 70 while reducing the length and weight of wire 50 added to the rollator 30.

The length of wire 50 may run along the outside of the rollator 30. Additionally or alternatively, all or a portion of the wire 50 may be run inside the frame 20 of the rollator 30. For example, the wire 50 may connect to the bracket 120, and then run inside the rollator through a hole in the handle 10. The wire 50 may exit to the outside of the frame 20 and connect to the brakes 70.

The lever 60 is pivotally mounted to the bracket 120 via a fastener 140 such that the lever 60 may be drawn closer to the grip 100. The fastener 140 may allow the lever 60 to pivot around a central axis of the fastener 140. The lever 60 may have a curved profile to accommodate a hand of a patient. Additionally or alternatively, the lever 60 may have a loop through which the hand of the user may be inserted. The lever 60 may be smooth or may have a textured surface to improve grip.

The lever 60 may be spring-biased so that when the lever 60 is drawn toward the grip 100, a spring provides a force to return the lever 60 to its original position, away from the grip 100. The spring may be provided in the bracket 120, integrated into the lever 60, or attached to the wire 50. When the spring is attached to the wire 50, the spring may communicate the force to return the lever 60 to its original position through the wire 50, allowing for the spring to be located away from the handle 10, for example, near the brake 70.

A locking mechanism is provided in the bracket 120 to allow the brakes 70 to be locked in an activated state. Once the lever 60 has been drawn toward the grip 100 to activate the brakes 70, a button 110 (also known as a lock) may be depressed which locks the lever 60 in the activated position. When the lock is in place, the brakes 70 of the braking system are activated, allowing the patient to release the lever 60 without the brakes 70 becoming deactivated. The button 110 may be deactivated upon being depressed, after which the lever 60 will return to its resting position and release the brakes 70. Alternatively, the button 110 may be deactivated by further drawing the lever 60 toward the grip 100, after which the lever 60 will return to its original position The button 110 may be located on the bracket 120 toward the outside of the rollator 30 to be accessible by hand of the patient. The button 110 may be located on the outside of the bracket 120, for example, within reach of an index finger of the patient when the hand of the patient is resting on the grip 100 and the other fingers of the hand of the patient are on the lever 60. In some cases, the button 110 may be positioned within a reachable distance (e.g., 1-6 inches, or specifically 1 inch, or 3 inches) of where the lever 60 connects to the bracket 120 at the fastener 140. Additionally or alternatively, the button 110 may be placed closer to where the lever 60 connects to the bracket 120 at the fastener 140, for example within 2 inches, so that the button 110 may be accessible to patients with shorter fingers or limited hand mobility.

In some cases, the button 110 may be located on the inside of the bracket 120 and the rollator 30, for example within reach of a thumb of the hand of the patient when the hand is resting on the grip 100. For example, the button 110 may be positioned within 3 inches of the fastener 140 that connects the lever 60 to the bracket 120. Additionally or alternatively, the hole in the bracket 120 through which the button 110 is inserted may allow for installation of the button 110 in multiple configurations. For example, the hole in the bracket 120 may allow for the button 110 to be installed to the inside or the outside of the bracket 120 using the same hole.

In another embodiment, the button 110 may be located on the top of the bracket 120 to be accessible by the hand of the patient when the palm of the patient is resting on top of the grip 100. The position of the button 110 relative to the grip 100 may be adjusted by loosening the fastener 130 and sliding the bracket 120, including the button 110, toward or away from the grip 100 on the handle 10. In this way, the button 110 may be positioned within 2 inches of the edge of the grip 100 to aid activation of the button 110 by the patient.

In yet another embodiment, the button 110 may be configurable in a variety of positions, thereby allowing a custom fit for the patient. For example, the bracket 120 may have multiple mounting holes for the button 110, allowing for the button 110 to be positioned in a number of orientations. In some cases, the bracket 120 will have more than one mounting hole relative to the fastener 140, such that the button 110 can be assembled in one of the holes in the bracket 120 depending on the size of the hand of the patient. The lever 60 may also have multiple indentations to accommodate locking with the button 110 in a number of different positions.

The button 110 may have a dished top for better manipulation by the patient. Alternatively, the button 110 may have a convex top so there are no sharp edges. The button 110 may also have a flat top. The top of the button 110 may be wider than a lower portion of the button 110, for example, to retain a spring that acts against the top of the button 110.

The grip 100 may be made of a material to accommodate the hand of the patient. For example, the grip 100 may include one or more gel or rubber pads. The grip 100 may have a profile adapted to support the hand of the patient, including the thumb. For example, the grip 100 may be 4 or more inches wide with a curved profile.

The grip 100 may be separate from the bracket 120. This allows the grip 100 and bracket 120 to be adjusted independently on the handle 10. Additionally or alternatively, the grip 100 and bracket 120 may be formed together as one piece.

Figure 4:
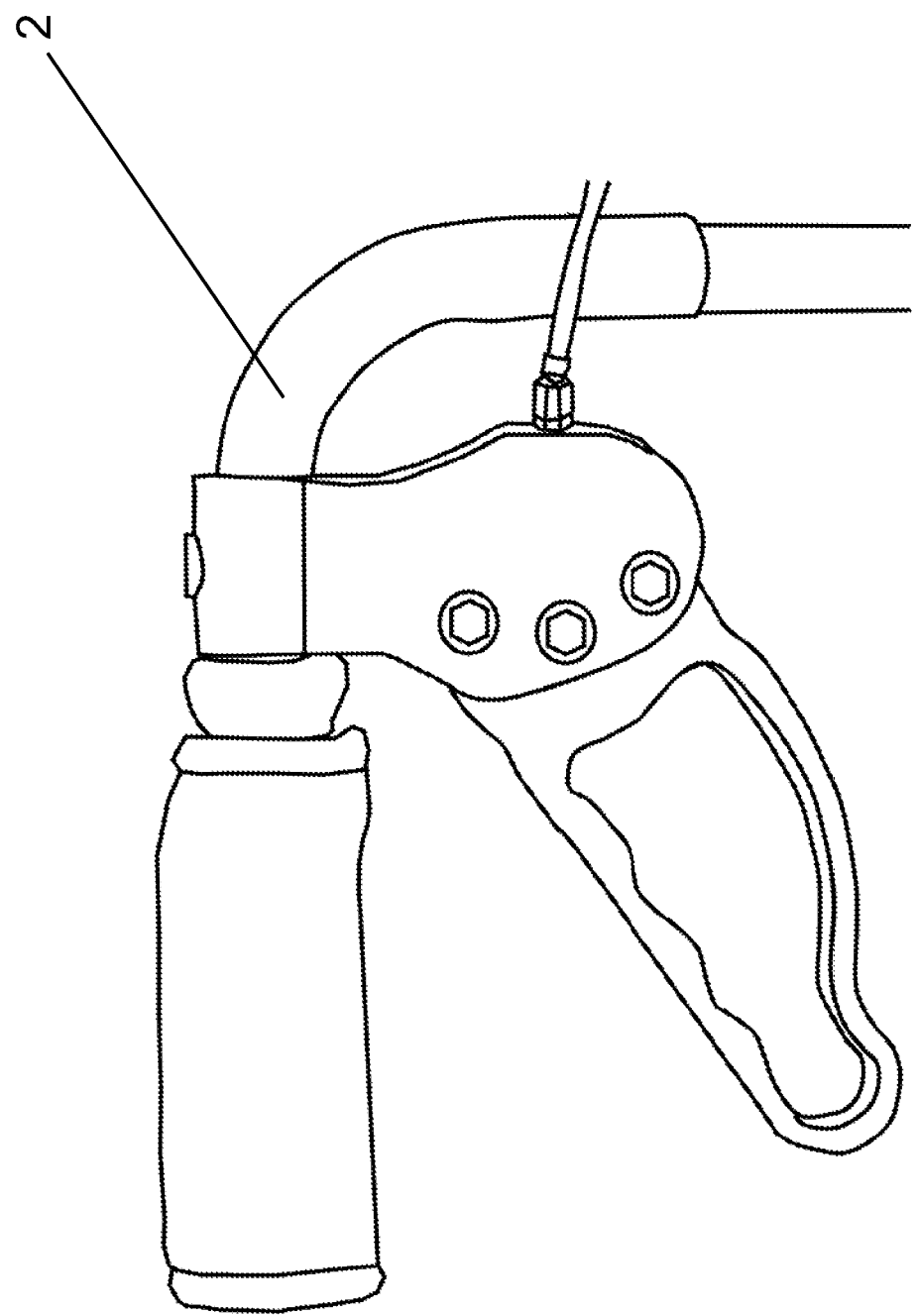
FIG. 4 is a photo of a prior art handle of a rollator with a conventional braking system.

FIG. 4 shows a conventional art braking system 2 for the rollator 1 including a handle and a lever. The lever of the braking system 2 is shaped so that the hand of the patient may fit through the lever. To temporarily activate the brakes, the lever is drawn toward the grip of the handle. To lock the brakes in an activated position, the lever is pushed downward, away from the grip of the handle.

Figure 5:
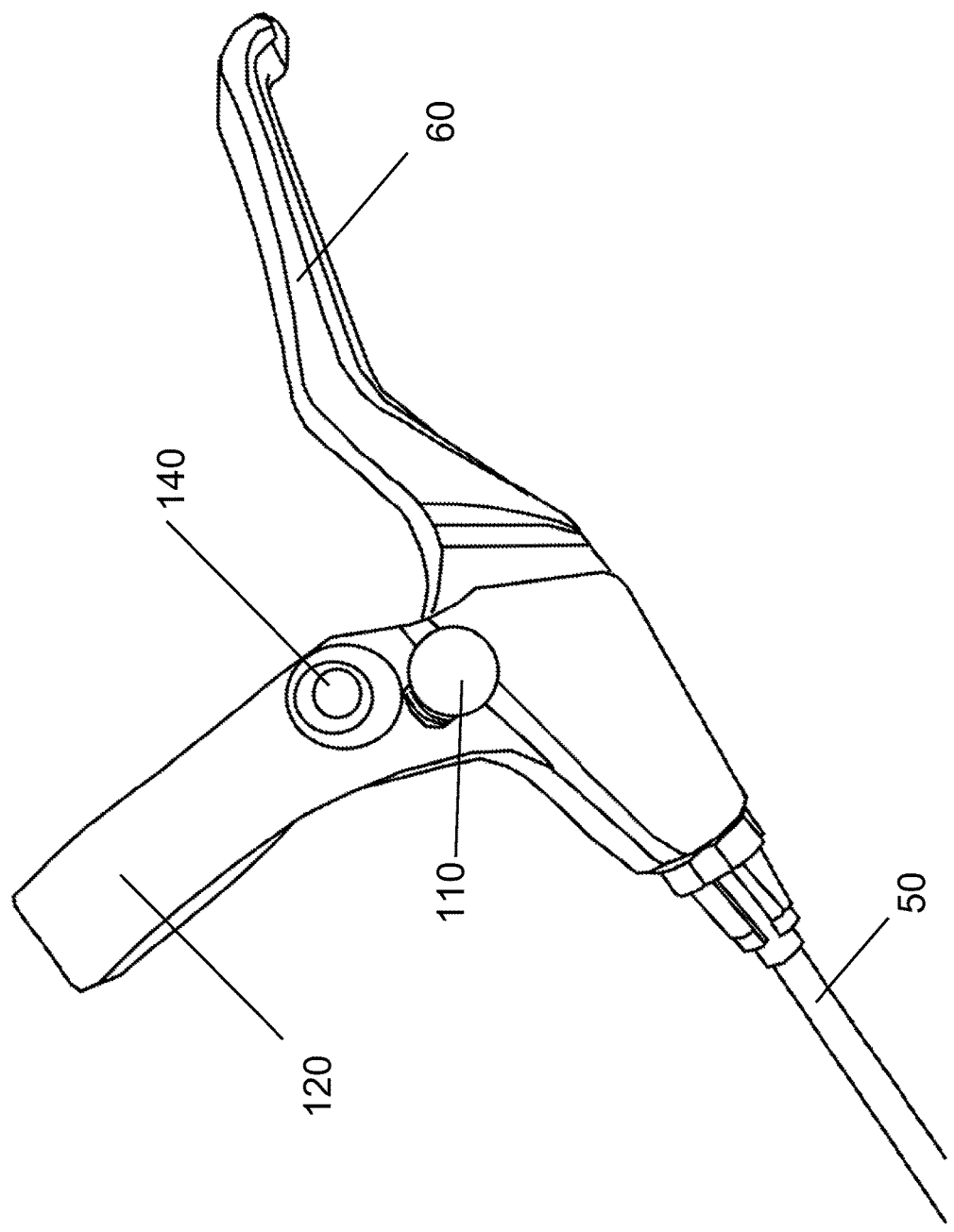
FIG. 5 is an outside perspective view of an exemplary embodiment of the brake lever of the new braking system.

FIG. 5 shows an outside perspective view of the bracket 120 including the lever 60, fastener 140, button 110, and wire 50. The button 110 is shown substantially perpendicular to the lever 60, but may be located in other orientations elsewhere on the bracket 120, as described above.

In some cases, an indentation in the surface of the bracket 120 may allow the fastener 140 to be recessed into the surface of the bracket 120. This may help prevent the fastener 140 from becoming loose over time.

Figure 6:
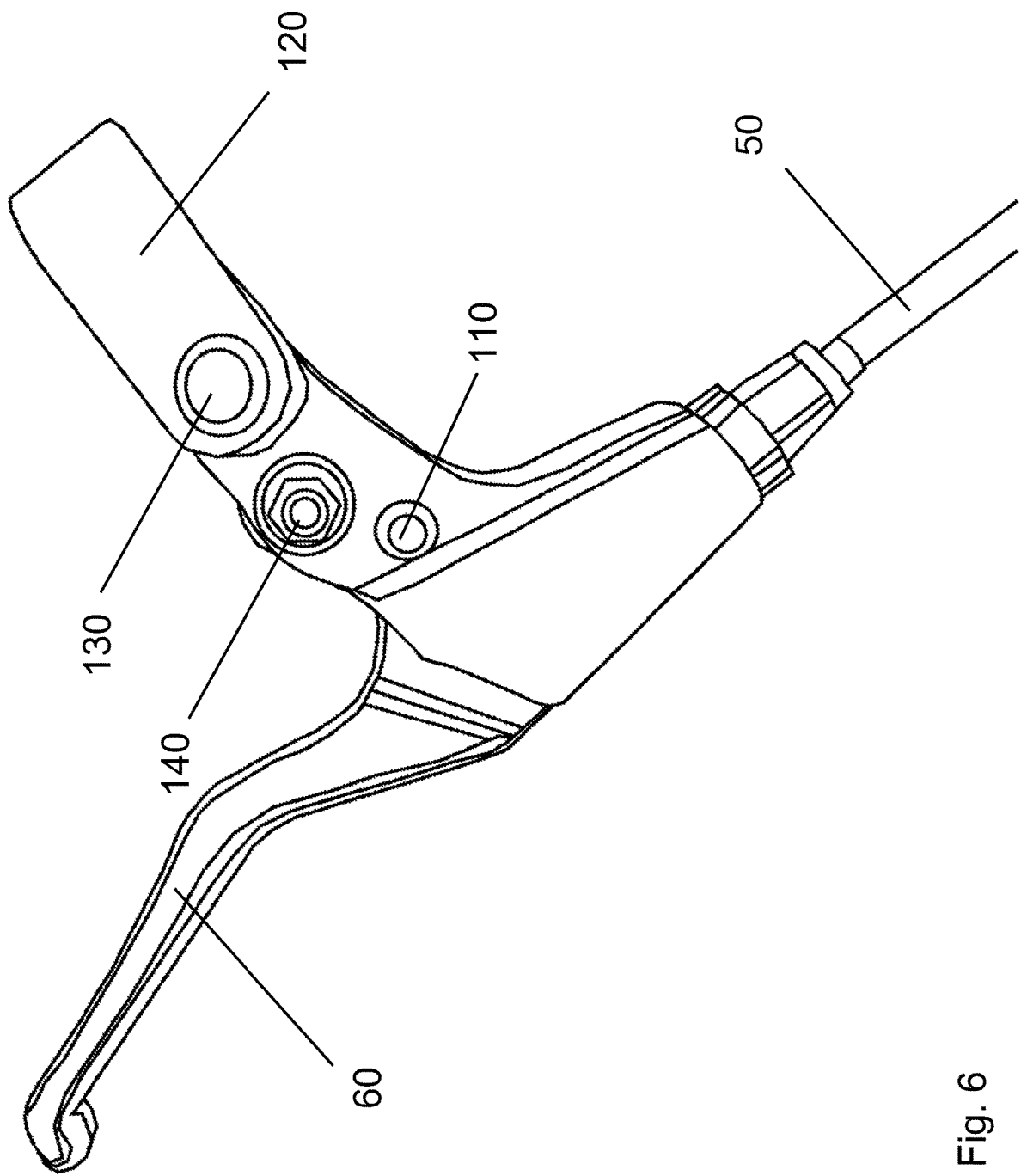
FIG. 6 is an inside perspective view of an exemplary embodiment of the brake lever of the new braking system.

FIG. 6 shows an inside perspective view of the bracket 120 including the fastener 130. While the fastener 130 is not completely tightened, the bracket 120 may expand, allowing the bracket 120 to be moved relative to the handle 10. The fastener 130 may be tightened to secure the bracket 120 to the handle 10. In this way, the bracket 120 may be fitted to handles 10 of different diameters.

The backside of the button 110 is shown. When the button 110 is depressed from the opposite side of the bracket 120, the button 110 may slide through a hole in the bracket 120 and extend past the inside of the bracket 120. In some cases, where the button 110 is present on the inside of the bracket 120, the button 110 may be pushed through the bracket 120 and extend past the outside of the bracket 120.

The backside of the fastener 140 is shown. The fastener 140 may be held in place relative to the bracket 120 with a complementary fastener. For example, a nut and washer may fix the fastener 140 to the bracket 120.

Figure 7:
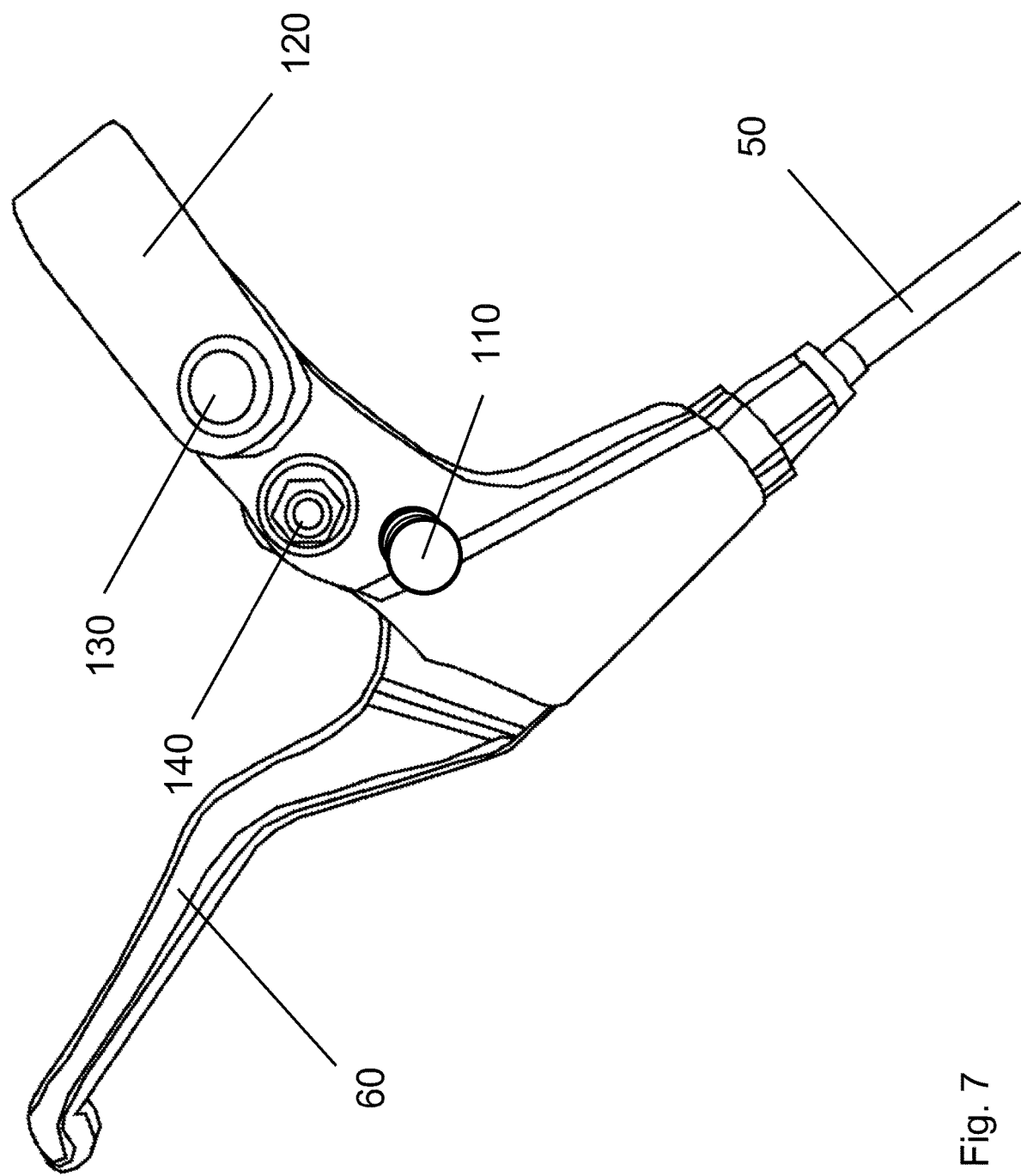
FIG. 7 is an inside perspective view of an exemplary embodiment of the brake lever of the new braking system showing an alternative placement of a button.

FIG. 7 shows a configuration of the handle 10 where the button 110 is located on the inside of the bracket 120. For certain patients, the button 110 may be more easily reached from the inside of the bracket 120 than from the outside, as in FIG. 5.

The bracket 120 may allow for the button 110 to be accessible from the inside or outside of the bracket 120, depending on how the button 110 is installed in the bracket 120. When the button 110 is installed on the inside of the bracket 120, the button 110 may be pushed through the bracket 120 and extend past the back side of the bracket 120.

Figure 8:
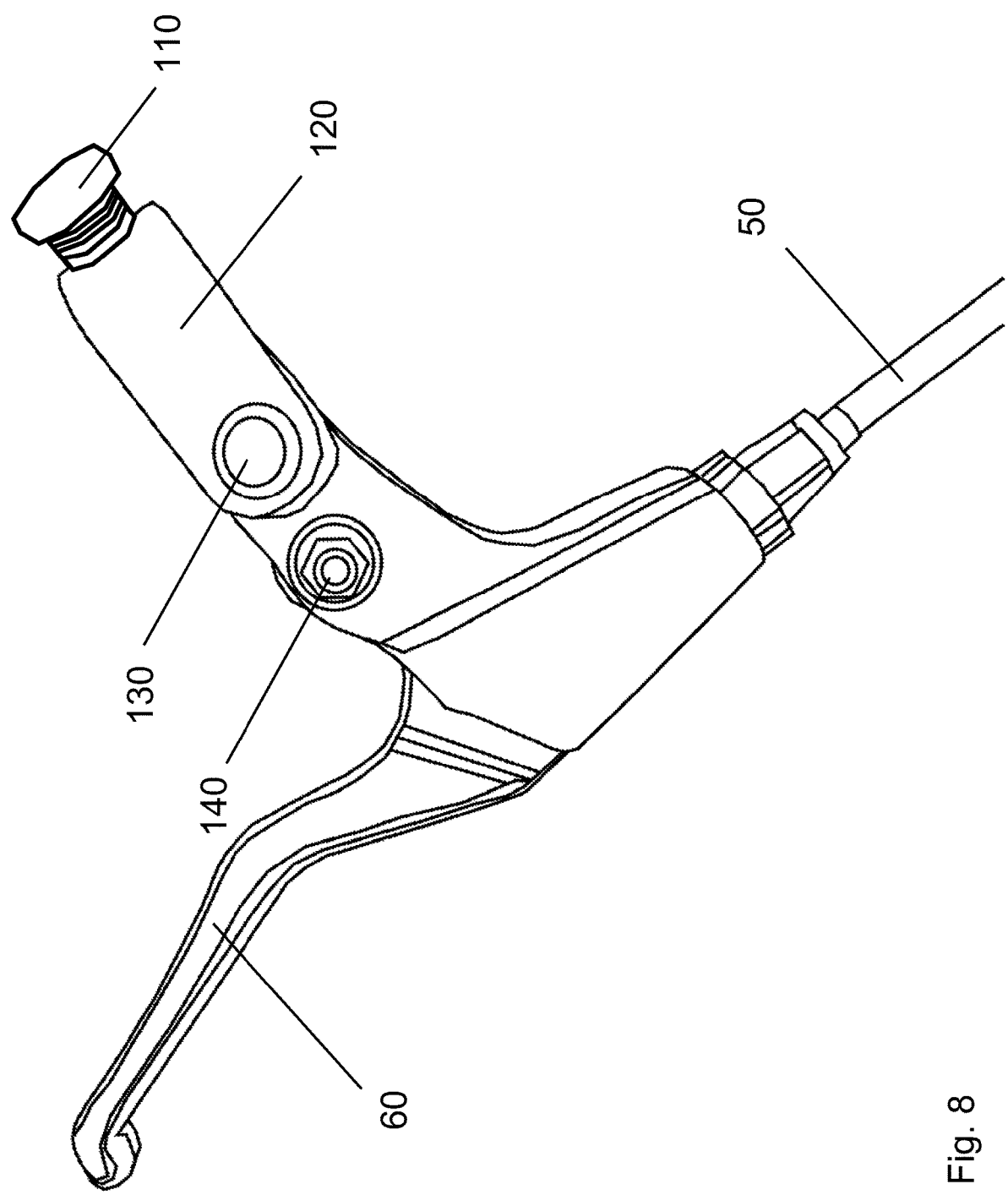
FIG. 8 is an inside perspective view of an exemplary embodiment of the brake lever of the new braking system showing alternative placement of a button.

FIG. 8 shows another configuration of the handle 10 where the button 110 is located on the top side of the bracket 120. The bracket 120 may be extended above where the bracket 120 connects to the handle 10 in order to accommodate the button 110 with a sufficient stroke when pushed.

Additionally or alternatively, the button 110 may be accessible to be pushed from the top of the bracket 120, but the button 110 may be offset to the inside or the outside of the handle 10, so that when the button 110 is pushed, the stroke of the button 110 goes along a side of the bracket 120. In such cases, the bracket 120 may not need to extend an additional amount beyond the handle 10. Instead, the side of the bracket 120 may receive the stroke of the button 110, allowing the button 110 to be depressed where otherwise the button 110 would contact the handle 10 through the bracket 120.

Figure 9:
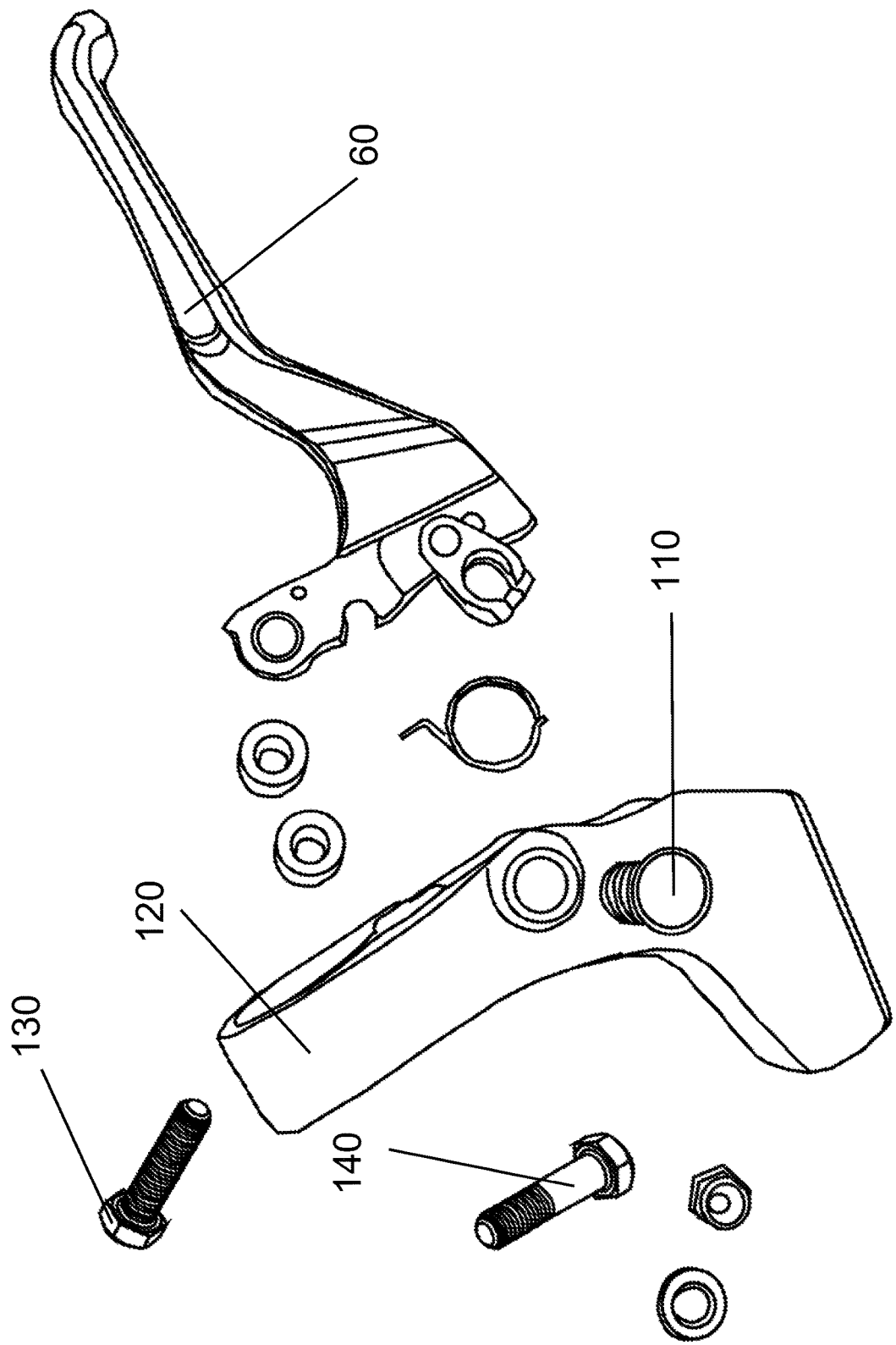
FIG. 9 is an exploded view of an exemplary embodiment of the brake lever assembly of the new braking system.

FIG. 9 shows an exploded view of the bracket 120 including the lever 60. The lever 60 may have an attachment point for connecting the wire 50 to the lever 60, such that as the lever 60 moves, a cable inside the wire 50 moves to activate the brakes 70. The lever 60 may pivot on washers or bearings to reduce friction in the handle 10, and thereby reduce the force needed to activate the brakes 70.

Figure 10:
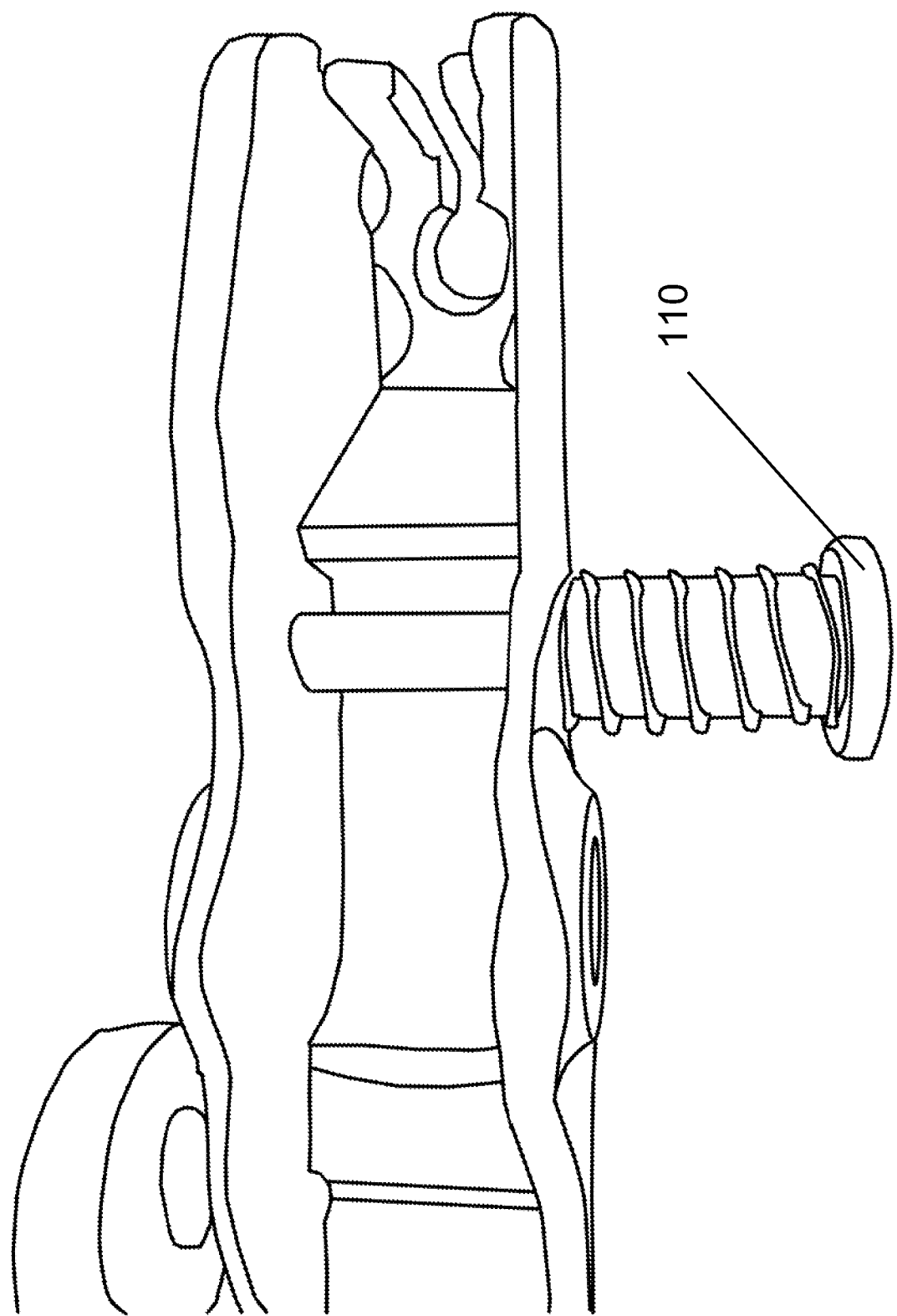
FIG. 10 is a perspective view of an exemplary embodiment of the locking mechanism of the new braking system in a disengaged position.
Figure 11:
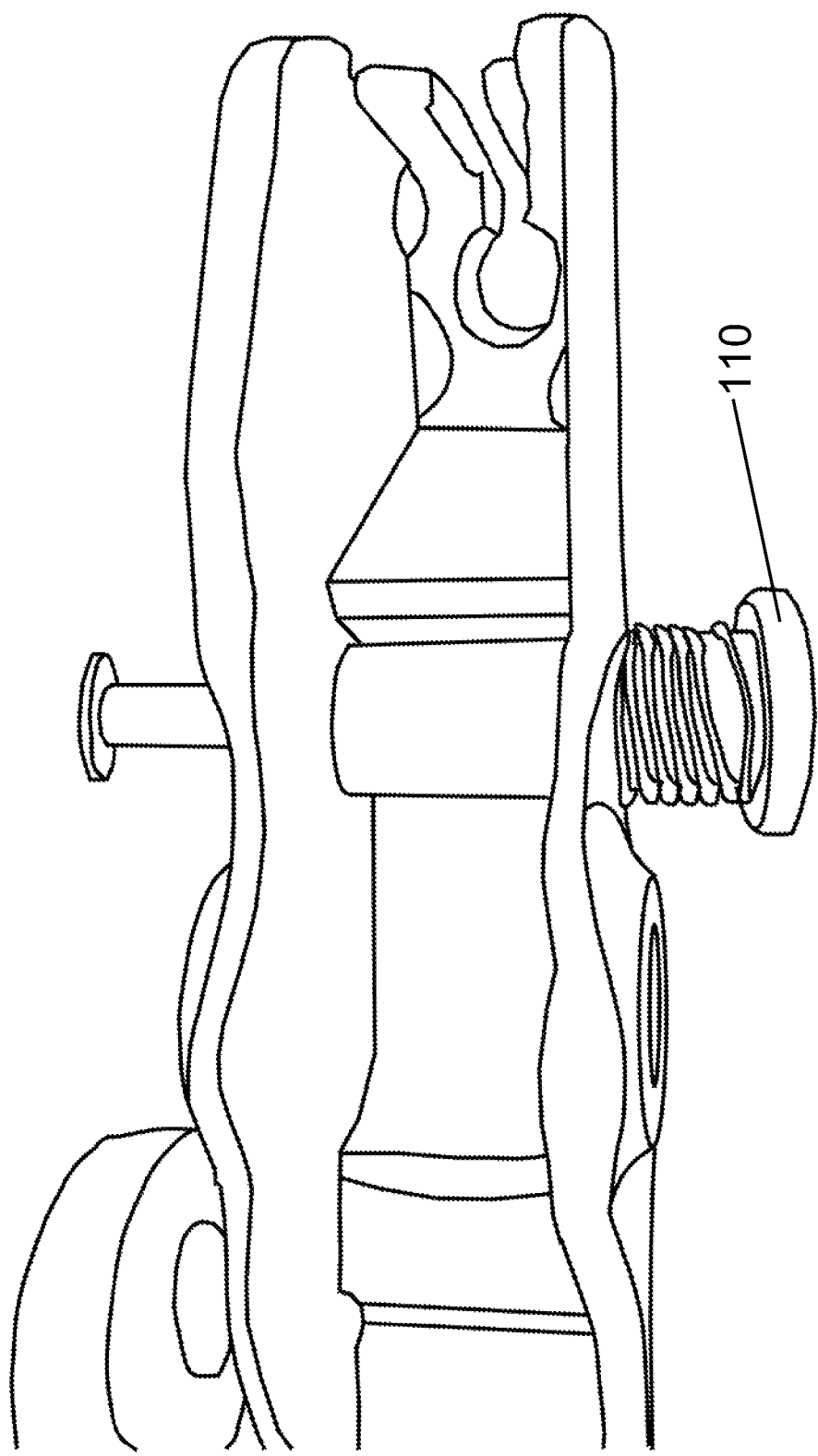
FIG. 11 is a perspective view of an exemplary embodiment of the locking mechanism of the new braking system in an engaged position.

FIGS. 10 and 11 show the button 110 for locking the brakes 70. FIG. 8 shows the button 110 where the brakes 70 are not engaged. In FIG. 9, the button 110 has been further inserted or pushed into the bracket 120 and the brakes 70 are engaged. A bottom end of the button 110 may extend beyond the bracket 120 when the lever 60 is locked. The patient may push either the bottom end or a top end of the button 110 to release the lever 60 when the lever 60 is locked.

The button 110 locks the brakes 70 in an engaged position by preventing the lever 60 from returning to a disengaged position. The button 110 and lever 60 may be returned to the disengaged position by pulling or pushing the button 110 out of the bracket 120. Additionally or alternatively, pulling the lever 60 while locked in the engaged position will allow the button 110 and lever 60 to return to the disengaged position. The button 110 may have a spring to assist the button 110 in returning to the disengaged position or to prevent the brakes 70 from being accidentally locked.

Figure 12:
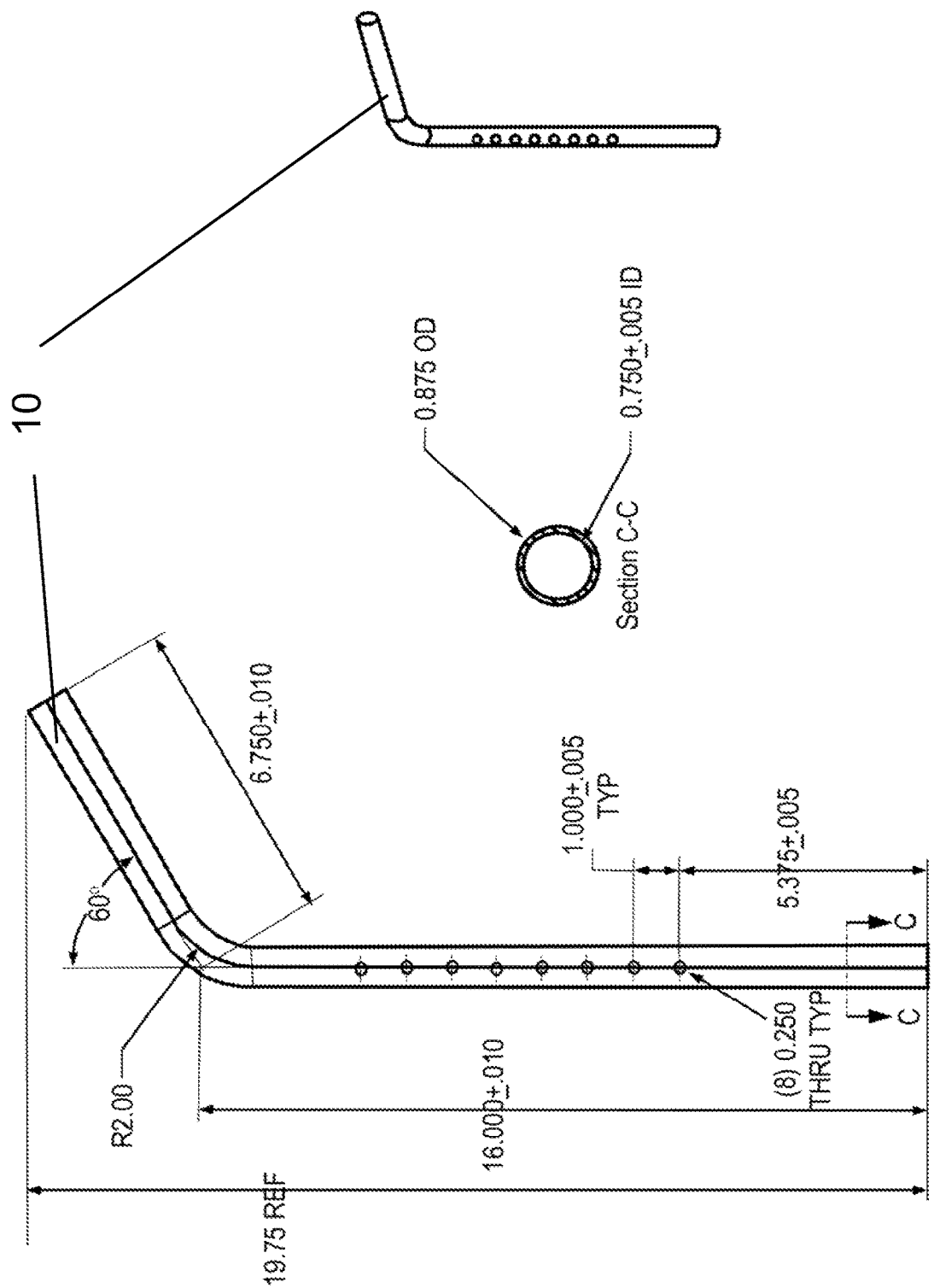
FIG. 12 is a drawing of an exemplary embodiment of the adjustable arm handle of the new braking system.
Figure 13:
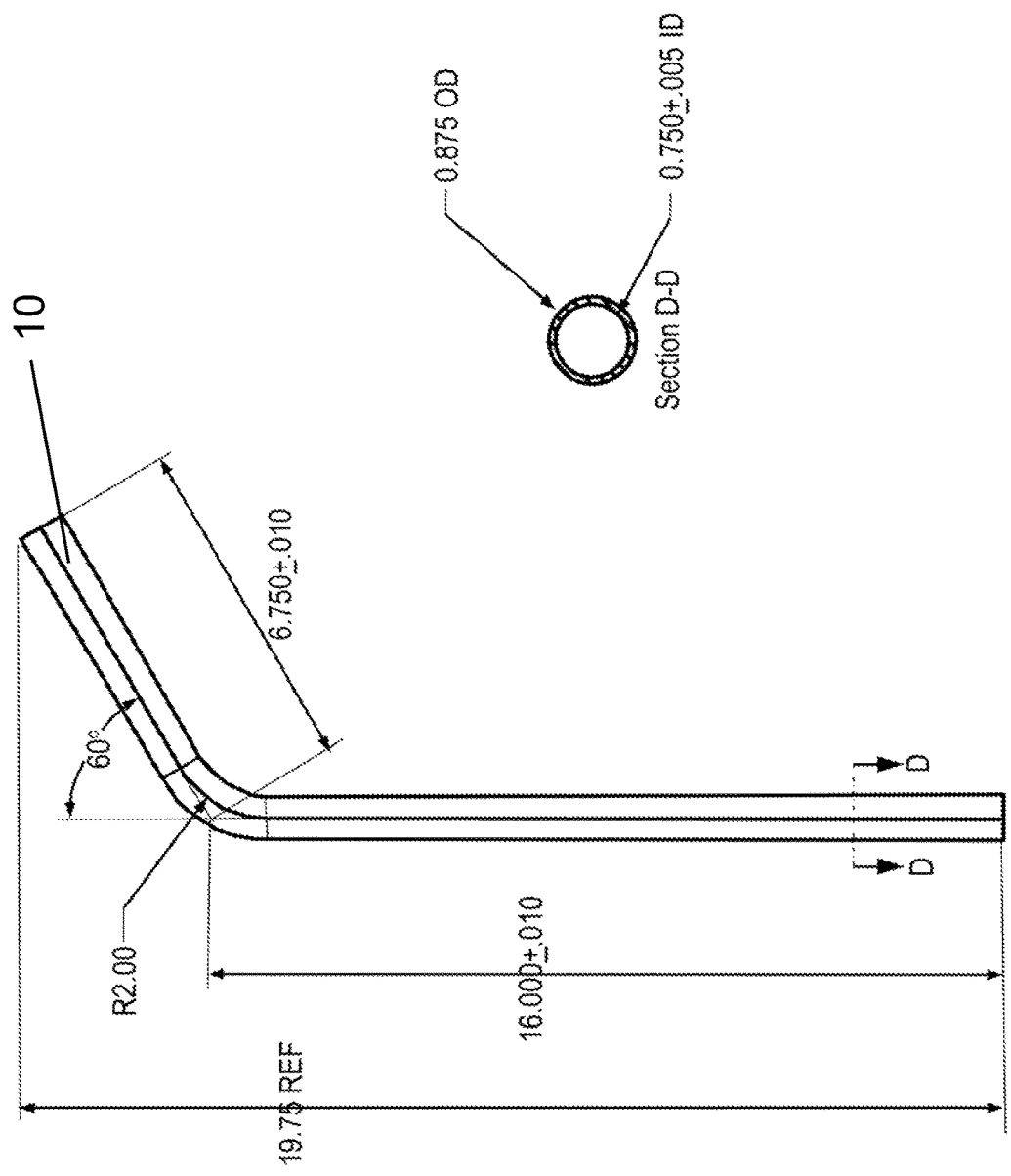
FIG. 13 is a drawing of an exemplary embodiment of the adjustable arm handle of the new braking system.

FIGS. 12 and 13 show the handle 10 of the braking system. The handle 10 has holes that allow for the handle 10 to be adjusted for the patient. The fastener 40 that secures the handle 10 to the rollator may be removed before the handle 10 is adjusted. For example, the handle 10 may be adjusted up and down in a vertical direction relative to the frame 20, or the handle 10 may be rotated to be angled inward or outward relative to the rollator. The handle 10 may have additional holes spaced at an angle from the holes shown in FIG. 12 that allow for the fastener to secure the handle 10 to the rollator at different angles. In some cases, the additional holes are placed at a 90-degree angle from other holes on the handle 10. The angle of the additional holes may be more or less than 90 degrees. For example, a smaller angle between holes may allow for multiple sets of additional holes on the handle 10 and allow the handle 10 to be rotated and secured to the rollator in multiple positions.

The holes, as shown, are spaced 1 inch apart center to center. In some cases, the holes may be spaced closer together or further apart. For example, the holes may be spaced 0.5 inches apart or 1.5 inches apart. Other spacings are possible as well. Additionally or alternatively, the holes may not be spaced uniformly so that the space between the holes may vary along the length of the handle 10. For example, the lower holes may be spaced further apart while the upper holes on the handle 10 may be spaced closer together.

The handle 10 has a bend. FIGS. 12 and 13 show a 60 degree bend in the handle 10. In some cases, the angle of the bend in the handle 10 may be less or more than 60 degrees. The angle of the bend in the handle 10 may depend on the angle of the front frame members 340, 360 relative to the ground, such that the handle 10 where the grip 100 attaches is parallel to the ground or substantially parallel to the ground or perpendicular to the direction of gravity. Additionally or alternatively, the bend in the handle 10 may be caused by an adjustable joint. The joint would allow the handle 10 to assume a range of degree of the bend and make the handle 10 adaptable for different patients and for installation in a variety of different rollators 30. The joint of the handle 10 may also allow for more convenient storage when the rollator 30 is collapsed because the handles 10 may be straightened.

The top of the handle 10, as shown, extends 6.75 inches from the bend. In some cases, the top of the handle 10 may be shorter or longer, for example, to accommodate different patients or rollators. Additionally or alternatively, the top of the rollator 30 may be adjustable in length, and may extend from or retract into the rest of the handle 10 to make the handle 10 longer or shorter.

The new braking system may be sold as a 'retrofit kit' for installation on an existing rollator. In this way, the kit may be sold and distributed separately from the rollator 30 and can replace the existing (e.g., previously installed, original) braking system present on the rollator 30. In some cases, the retrofit kit will have the bracket 120 (with the wire 50, lever 60, button 110, and fasteners 130, 140 installed in the bracket 120) and grip 100 pre-installed on the handle 10. Additionally or alternatively, the handle 10 may be installed onto a new rollator, or the bracket 120 and grip 100 may be installed on an existing, non-adjustable handle.

Figure 14:
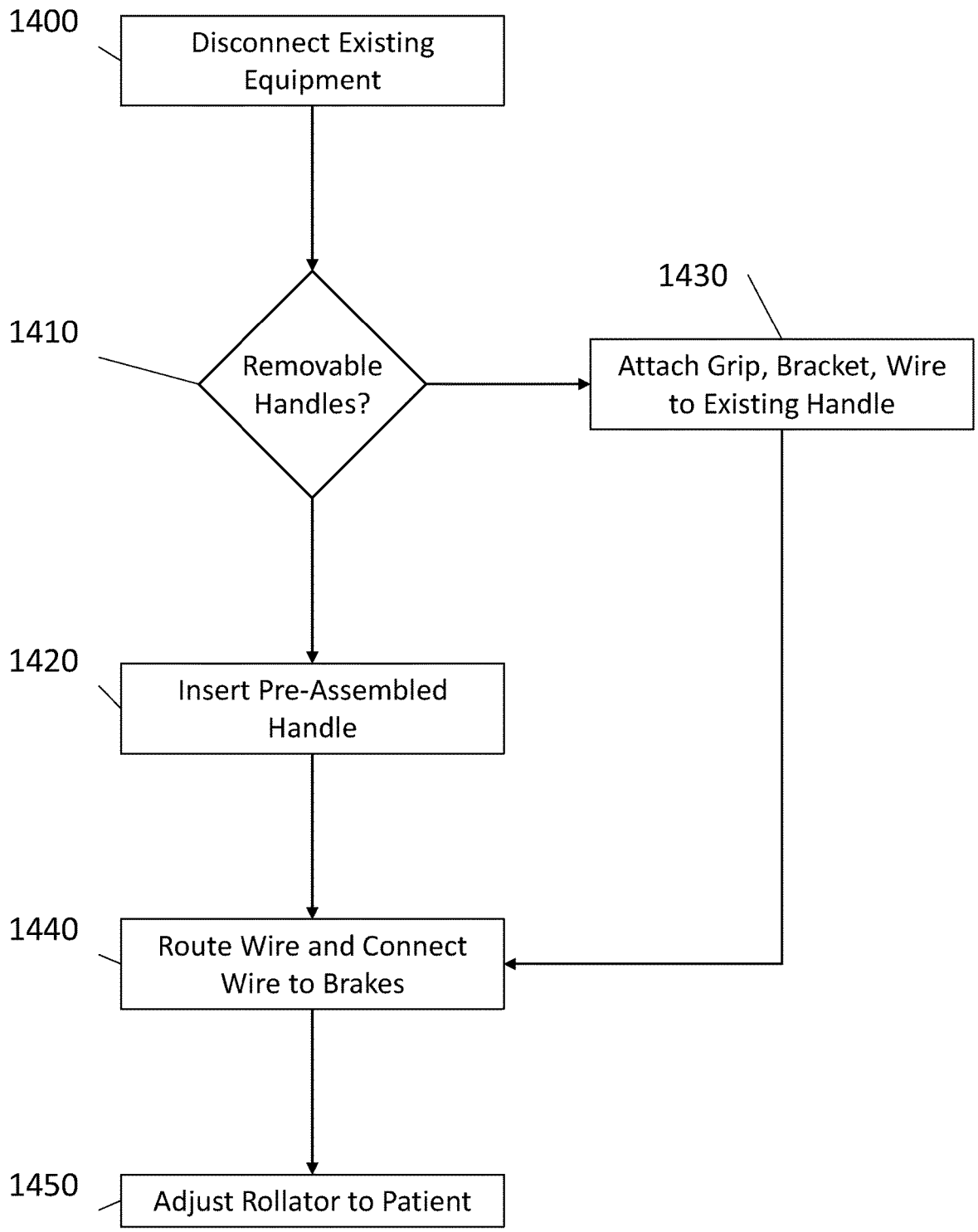
FIG. 14 shows an exemplary flowchart of a method of attaching a retrofit kit to a rollator.

FIG. 14 shows an exemplary flowchart of a method of installing the retrofit kit on a rollator. The retrofit kit may be installed on an existing rollator. In act 1400, the existing equipment on the rollator is removed. The existing wires may be disconnected from the brakes 70 on the rollator to prepare for installation of the retrofit kit. The retrofit kit may come pre-assembled with the bracket 120 and grip 100 installed on the handle 10. Additionally or alternatively, the retrofit kit may contain the parts described above in a disassembled state, and may be assembled as described below.

In act 1410, it is determined whether or not the rollator has removable handles. If the handle of the rollator is removable, then the existing handle may be removed in act 1420, along with the existing fastener, grip, bracket, and wire, to make way for the handle 10 of the retrofit kit. Once the existing handle on the rollator is removed, the handle 10 of the retrofit kit may be installed in place of the existing rollator. The handle 10 may be held in place by the fastener 40. In some cases, the handle 10 may be adapted to use the existing fastener from the rollator. Additionally or alternatively, the retrofit kit may include a fastener 40 to secure the handle 10 to the rollator.

If the handle of the rollator is not removable, then the existing grip, bracket, and wire may be removed from the existing handle of the rollator in act 1430. Then, the bracket 120 and grip 100 from the retrofit kit may be installed on the existing handle of the rollator. The bracket 120 may be placed over the handle before the grip 100, which may be added later. The fastener 130 may be tightened to ensure the bracket 120 does not move relative to the handle, for example, when the lever 60 is pulled.

In act 1440, once the bracket 120 is installed on the handle, either using the handle 10 from the retrofit kit (the kit may have the bracket 120 pre-installed on the handle 10) or the existing handle, the wire 50 may be routed and attached to the brakes 70. Routing the wire 50 may involve securing the wire 50 to the frame of the rollator and trimming the length of the wire 50 to reduce slack in the wire 50. For example, the retrofit kit may include cable ties or zip ties for fastening the wire to the frame. Attaching the wire 50 to the brakes 70 may involve attaching the cable inside the wire 50 to the brakes 70.

Once the handle 10, bracket 120, grip 100, and wire 50 are installed on the rollator, the new braking system may be adjusted to meet the ergonomic needs of the patient in act 1450. For example, the handle 10 may be adjusted up or down in height so that the lever 60 on the bracket 120 and the grip 100 meet the hands of the patient. The adjustment may occur in the presence of the patient, or based on the height, pathology, or other data of the patient.

The handle 10 may have a different diameter at one end segment than at the rest of the handle 10. For example, the handle 10 may taper to a smaller diameter to allow the handle 10 to be installed in a rollator that has a smaller diameter frame while maintaining a larger diameter for the bracket 120 and grip 100 to attach to the handle 10 at the opposite end. Additionally or alternatively, the handle 10 may come in multiple pieces with a fitting joining the pieces together. In some cases, a top part of the handle 10 may have a consistent diameter to accommodate a standard bracket 120 and grip 100, and may attach to a variety of different lower portions of the handle 10 with different diameters to accommodate a variety of rollators with different diameter frames. For example, a top part of the handle 10 may attach to a lower part of the handle 10 with a smaller diameter for installation in a rollator with a frame diameter less than the inside diameter of the bracket 120 and grip 100.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A rollator comprising:
   a collapsible frame comprising a right subframe and a left subframe joined by a perpendicular supporting member;
   at least three wheels, wherein on each of the right subframe and the left subframe is rotatably mounted at least one of the at least three wheels;
   a seat mounted to the right subframe and left subframe or to the perpendicular supporting member and configured to be accessible from a backside of the rollator;
   at least one brake mounted to the collapsible frame and operable to slow rotation of one of the at least three the wheels;
   an adjustable handle supported by the collapsible frame;
   a bracket fixedly mounted to the adjustable handle;
   a lever rotatably mounted to the bracket and disposed below the adjustable handle;
   a wire connected on a first end to the lever and on a second end to the at least one brake such that the wire applies the at least one brake when the lever is rotated toward the bracket and the wire applies the at least one brake when the lever is fixed in a locked position; and
   a lock movably connected to the bracket, disposed below the adjustable handle and slidably disposed through the bracket, and configured to fix the lever in the locked position when the lever is rotated toward the adjustable handle and the lock is depressed into the bracket.

2. The rollator of claim 1, further comprising:
   a grip connected to the handle; and
   a backrest mounted to the right subframe and the left subframe and located along a front side of the rollator.

3. The rollator of claim 1, wherein the lever is configured such that when the lever is fixed in the locked position by the lock, rotating the lever toward the collapsible frame releases the lock and returns the lever to an unlocked position.

4. The rollator of claim 1, wherein the lock is positioned to be movable from a top surface of the collapsible frame, an inside surface of the collapsible frame, an outside surface of the collapsible frame, or any combination thereof.

5. The rollator of claim 1, wherein the wire comprises a cable inside of a sheath and wherein the cable is drawn through the sheath to apply the at least one brake.

6. A method of manufacturing a rollator, the method comprising:
   joining a right subframe and a left subframe together with a perpendicular supporting member;
   rotatably mounting at least three wheels to the right subframe, left subframe, or right subframe and left subframe, wherein on each of the right subframe and the left subframe is rotatably mounted at least one of the at least three wheels;
   mounting a seat to the right subframe, to the left subframe, or to the perpendicular supporting member, wherein the seat is configured to be accessible from a backside of the rollator;
   mounting at least one brake to the frame such that the at least one brake is operable to slow rotation of one of the at least three wheels;
   mounting an adjustable handle to the frame;
   mounting a bracket to the handle;
   rotatably mounting a lever to the bracket below the adjustable handle;
   connecting a first end of a wire to the lever and a second end of the wire to the at least one brake such that the wire applies the at least one brake when the lever is rotated toward the bracket and when the lever is fixed in a locked position; and
   mounting a lock slidably through the bracket below the adjustable handle, the lock being configured to fix the lever in the locked position when the lever is rotated toward the adjustable handle and the lock is depressed through the bracket.

7. The method of claim 6, further comprising:
   sliding a grip over an outer surface of the handle.

8. The method of claim 6, wherein the lever is configured such that when the lever is fixed in the locked position by the lock, rotating the lever toward the frame releases the lock and returns the lever to an unlocked position.

9. The method of claim 6, wherein the lock is positioned to be movable from a top surface of the frame, an inside surface of the frame, an outside surface of the frame, or any combination thereof.

10. The method of claim 6, wherein the wire comprises a cable inside of a sheath and wherein the cable is drawn through the sheath to apply the at least one brake.

* * * * *